United States Patent
Lev et al.

(10) Patent No.: US 11,865,977 B2
(45) Date of Patent: Jan. 9, 2024

(54) MEDIA SENSING PHONE MOUNT FOR A VEHICLE

(71) Applicants: Yaron Lev, Raeshon Izion (IL); David Ben Shitrt, Raeshon Izion (IL)

(72) Inventors: Yaron Lev, Raeshon Izion (IL); David Ben Shitrt, Raeshon Izion (IL)

(*) Notice: Subject to any disclaimer, the term of this patent is extended or adjusted under 35 U.S.C. 154(b) by 758 days.

(21) Appl. No.: 16/984,232

(22) Filed: Aug. 4, 2020

(65) Prior Publication Data
US 2022/0041116 A1 Feb. 10, 2022

(51) Int. Cl.
| H04M 1/00 | (2006.01) |
| B60R 11/02 | (2006.01) |
| H02J 7/00 | (2006.01) |
| B60R 11/04 | (2006.01) |
| H04B 1/3822 | (2015.01) |
| B60R 11/00 | (2006.01) |

(52) U.S. Cl.
CPC .......... B60R 11/0241 (2013.01); B60R 11/04 (2013.01); H02J 7/0044 (2013.01); H04B 1/3822 (2013.01); *B60R 2011/001* (2013.01); *B60R 2011/0294* (2013.01)

(58) Field of Classification Search
CPC .... B60R 11/0241; B60R 11/04; H02J 7/0044; H04B 1/3822
See application file for complete search history.

(56) References Cited

U.S. PATENT DOCUMENTS

| 9,961,306 B1* | 5/2018 | Lev ..................... H04R 1/028 |
| 2002/0000357 A1 | 1/2002 | Henderson |
| 2004/0246607 A1 | 12/2004 | Watson et al. |
| 2008/0089658 A1 | 4/2008 | Grady et al. |
| 2011/0098087 A1 | 4/2011 | Tseng |
| 2012/0292463 A1* | 11/2012 | Burns .................... F16M 11/40 248/125.8 |
| 2018/0341289 A1* | 11/2018 | Schachter ............... B60R 11/02 |
| 2019/0353189 A1* | 11/2019 | Saculles ............... F16M 11/041 |
| 2021/0197689 A1* | 7/2021 | Reimer .................. B60L 50/66 |

FOREIGN PATENT DOCUMENTS

WO    WO0137519 A2    1/2001

\* cited by examiner

*Primary Examiner* — Simon King

(57) ABSTRACT

In some embodiments, an apparatus may install easily like a simple cell phone holder while facilitating controlling cameras mounted and/or fixed to a vehicle using a cell phone. For example, the system may facilitate installing, monitoring, powering and/or controlling vehicle mounted sensors without having to integrate the system into each particular vehicle. An aspect of some embodiments of the current invention relates to an integrated apparatus for mounting a mobile device and a media sensor on an open and/or two wheeled vehicle and for positioning a media sensor on that vehicle. Optionally, a camera integrated to the mount such that the field of view (FOV) of the camera is preserved over a desired scene even as the position of the mobile device is changed and/or the vehicle performs various maneuvers. In some, embodiments an integrated apparatus may be mounted to a rearview mirror of a vehicle.

19 Claims, 11 Drawing Sheets

MEDIA SENSING PHONE MOUNT FOR A VEHICLE

FIELD AND BACKGROUND OF THE INVENTION

The present invention, in some embodiments thereof, relates to a phone mount and, more particularly, but not exclusively, to a multipurpose vehicle phone mount.

U.S. Pat. No. 9,961,306 to the present inventor appears to disclose, "An apparatus for a mobile device, the holder including: a support structure including a mounting apparatus, adapted for fixing the apparatus in place within an interior space, a coupling mechanism adapted for removably coupling the mobile device to the support structure, and a control unit housing; a processor unit, housed in the housing; a wireless transceiver, operationally coupled to the processor unit and configured to communicate with the mobile device; and a speaker, operationally coupled to the processor unit and the wireless transceiver and configured to output audio data received from the mobile device by the wireless transceiver."

SUMMARY OF THE INVENTION

According to an aspect of some embodiments of the invention, there is provided an apparatus for a mobile electronic device including: a support structure including a mount for connecting the apparatus to a vehicle; a coupling mechanism adapted for removably coupling to the mobile device; a flexible joint connecting the coupling mechanism to the mount; and a processor built into the support structure; a databus configured for transferring data between the processor and the mobile device; a media sensor integrated into the mount and electronically connected to the processor.

According to some embodiments of the invention, the databus is wireless.

According to some embodiments of the invention, the apparatus further includes: a second flexible joint connecting the media sensor to the mount.

According to some embodiments of the invention, the apparatus further includes: a second flexible joint connecting the sensor to the mount.

According to some embodiments of the invention, the apparatus further includes: a rechargeable battery supplying energy to the processor and the media sensor.

According to some embodiments of the invention, the apparatus further includes: a conductor configured for conducting the energy from the rechargeable battery to the mobile device.

According to some embodiments of the invention, the apparatus further includes: a charger configured for conducting energy from a battery of the vehicle to the rechargeable battery.

According to some embodiments of the invention, the apparatus further includes: a charger configured for conducting energy from a battery of the vehicle to the processor and the media sensor.

According to some embodiments of the invention, the apparatus further includes: a conductor configured for conducting the energy from the charger to the mobile device.

According to some embodiments of the invention, the apparatus further includes: a wireless network transceiver operationally coupled to the processor, the wireless network transceiver configured for data communication with a cellular network.

According to some embodiments of the invention, the apparatus further includes: a storage medium, operationally coupled to the media sensor, the processor configured to record and store visual, audio or audiovisual input, sensed by the media sensor, on the storage medium.

According to some embodiments of the invention, the processor is configured to activate the media sensor upon sensing motion within a field of view or noise above a predefined volume threshold.

According to some embodiments of the invention, the mount is configured to attach to a handlebar.

According to some embodiments of the invention, the flexible joint is configured to automatically keep the media sensor directed in a direction of travel of the vehicle when the vehicle during at least on maneuver selected from turning the handlebar and tipping the vehicle.

According to some embodiments of the invention, the mount is configured to attach to a rear-view mirror.

According to some embodiments of the invention, the media sensor includes at least one sensor selected from a video camera, a microphone and a combination audiovisual sensor.

According to some embodiments of the invention, the media sensor includes a plurality of sensors.

According to some embodiments of the invention, the apparatus further includes a hands-free communication system.

According to some embodiments of the invention, the apparatus a remote camera in data communication with the processor.

According to some embodiments of the invention, the apparatus includes a cable connecting the remote camera to the processor.

According to some embodiments of the invention, the remote camera is integrated to the second mount.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1A:
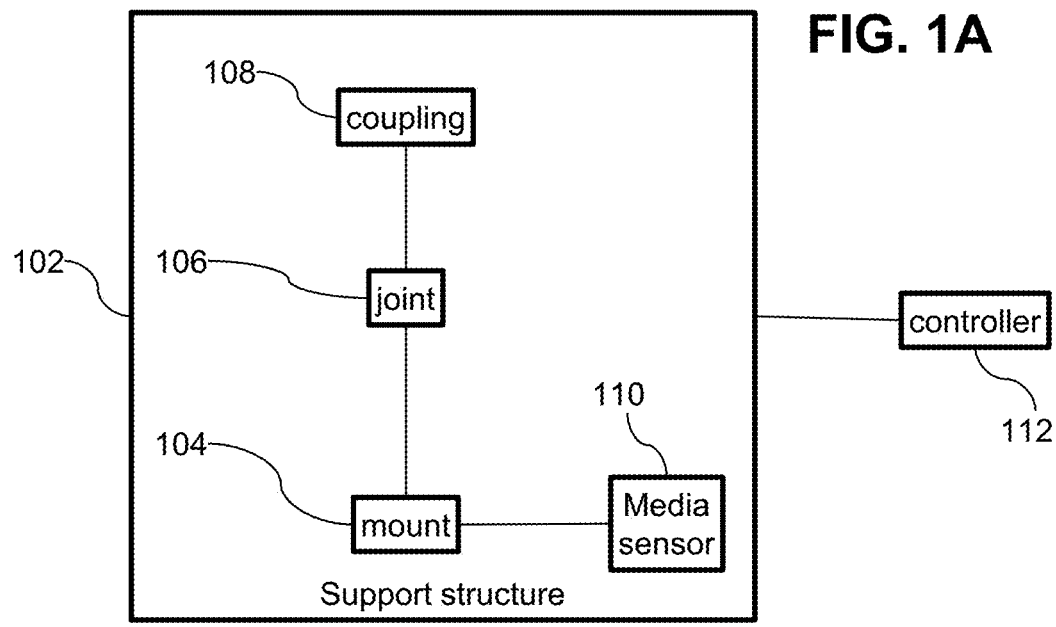
FIG. 1A is a block diagram of a mobile device holder in accordance with an embodiment of the current invention.

The present invention, in some embodiments thereof, relates to a phone mount and, more particularly, but not exclusively, to a multipurpose vehicle phone mount.

Overview

An aspect of some embodiments of the current invention relates to an integrated apparatus for mounting a mobile device and a media sensor on an open and/or two wheeled vehicle and for positioning a media sensor on that vehicle. For example, the apparatus may include a mount to a bar (e.g. a handle bar and/or an upright bar). Optionally, a media sensor (e.g. a camera) is integrated to the mount such that the field of view (FOV) of the camera is preserved over a desired scene even as the position of the mobile device is changed and/or the vehicle performs various maneuvers. In some embodiments, a kit includes a plurality of cameras and/or mounts. For example, one mount may be used for a forward-facing camera and another mount for a rear facing camera. Optionally, the system is configured for both cameras to be controlled and/or send data to a single processor. Optionally, the system includes a wired and/or wireless bus for transferring data between the processor of the apparatus and/or a processor of a mobile device attached thereto. For example, a user may control the cameras and/or view camera output via the mobile device (e.g. though a touchscreen of the mobile device.

In some embodiments, the apparatus of the current inventions combines ease of installation with multifunctionality. For example, the apparatus may install easily like a simple cell phone holder while supplying functionality which often requires complex integration with a vehicle. For example, the system may facilitate controlling cameras mounted and/or fixed to a vehicle using a cell phone. For example, the system may facilitate installing, monitoring, powering and/or controlling vehicle mounted sensors without having to integrate the system into each particular car. For example, the system may include a hands-free control system for a cell phone, optimized for use in a car without requiring integration into car resource (for example the sound system). For example, the apparatus of the current invention may facilitate installation in one step of a car sensor system and/or a cell phone stand and/or a car protection system (e.g. a burglar alarm, a car tracking system, a forgotten child monitor, a driver monitor).

An aspect of some embodiments of the current invention relates to an integrated apparatus for mounting a mobile device and a media sensor on a rear-view mirror of a vehicle. One or more media sensors (for example a forward viewing camera and/or a camera that is directed to the vehicle driver) may be integrated to the mount to remain stable as a position of the mobile device is adjusted. Alternately or additionally, one or more cameras may be mounted to a coupling for the mobile device and/or move with the mobile device (for example a camera that is to be directed to the user of the mobile device).

Specific Embodiments

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1A is a block diagram of a mobile device holder apparatus in accordance with an embodiment of the current invention. In some embodiments, a support structure 102 includes a mount 104 for mounting to a vehicle. For example, the mount 104 may include a hook or clamp to connect the support structure to the rear-view mirror of a vehicle. Alternatively or additionally, a mount 104 may include a clamp that fits to a handlebar and/or an upright bar and/or another part of an open vehicle and/or a two wheeled vehicle and/or a three wheeled vehicle and/or a personal vehicle (e.g. a bicycle, a scooter, a motorized cycle, a tricycle, a Segway and/or an electric vehicle, a personal transporter, a self-balancing vehicle) and the like.

In some embodiments, the support structure 102 includes a coupling 108 for holding a mobile computing device, for example a cellular phone and/or a smartphone and/or a tablet. The coupling 108, optionally reversible connects to the mobile device to the support structure. For example, the coupling 108 using flexible straps and/or a magnetic connector and/or a hook and loop connector (e.g. Velcro™) and/or a tension element and/or a clamping element and/or a cradle and/or a suction cup. Optionally, the position of a coupling 108 can be adjusted. In some embodiments, the coupling is attached to the mount by a joint 106. Optionally, the joint 106 is adjustable, for example, allowing a user to adjust the position of a user interface of the mobile device for convenient use. Alternatively or additionally, the joint may be fixed and/or include a locking mechanism, for example, to inhibit vibrations of the vehicle from knocking the mobile device out of its preferred position. For example, joint 106 may include a gooseneck and/or one or more hinges and/or on or more sliding elements and/or one or more locking elements and/or a ball joint and/or a rotating joint and/or a flexible arm.

In some embodiments, a media sensor 110 is integrated into the support structure. For example, the media sensor 110 may be fixed in relation to the mount 104 of the support structure (for example, keeping the sensor stationary as the position of the mobile device is changed). Optionally, the sensor may be directed toward a specific area. For example, a forward directed camera may be directed in a direction of movement of a vehicle. For example, a user monitoring camera may be directed at the operator of the vehicle and/or at a passenger area of the vehicle. A rear and/or side directed camera may be directed to an area beside and/or behind the vehicle.

Figure 3A:
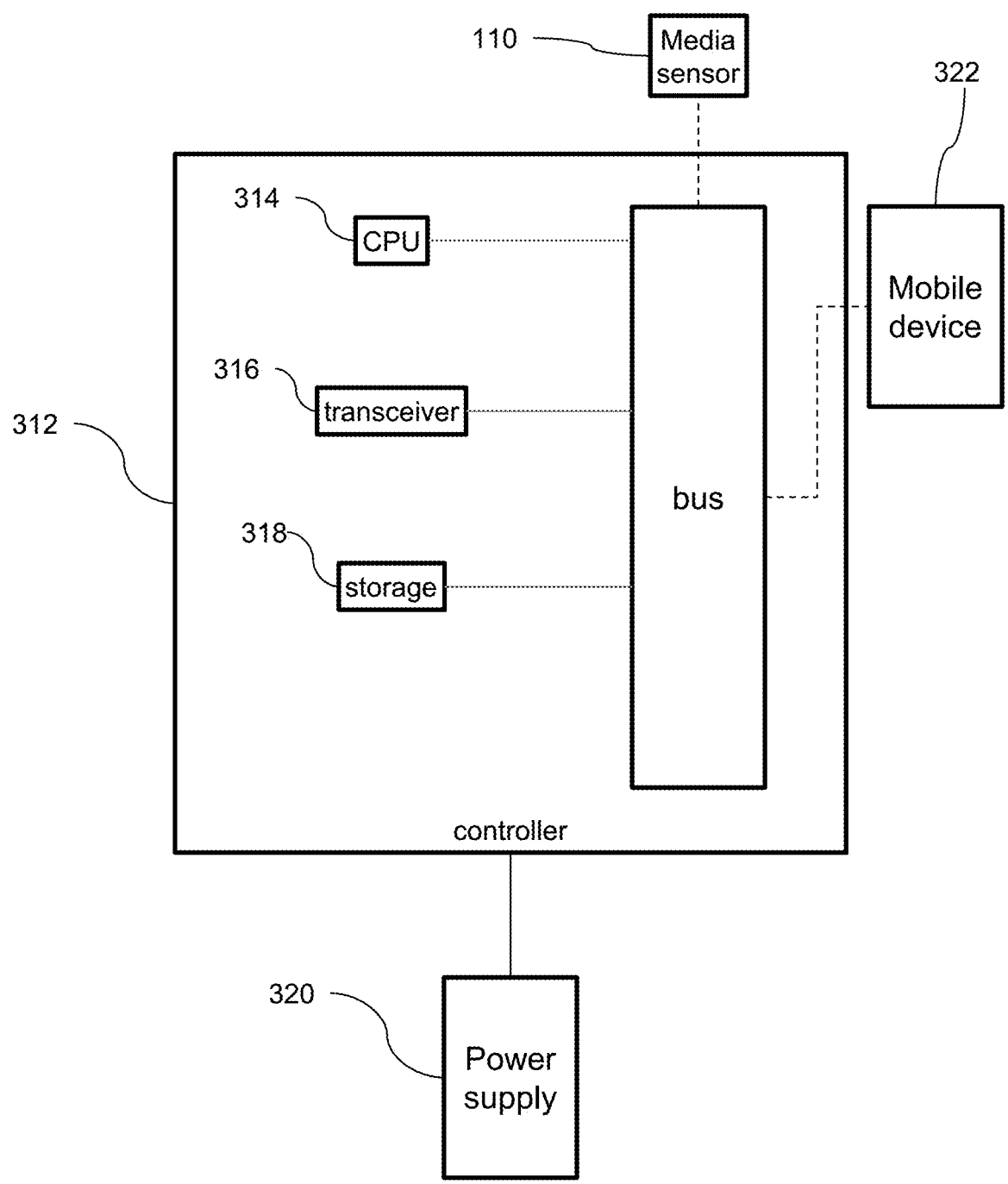
FIG. 3A is a block diagram of a controller in accordance with an embodiment of the current invention.
Figure 3B:
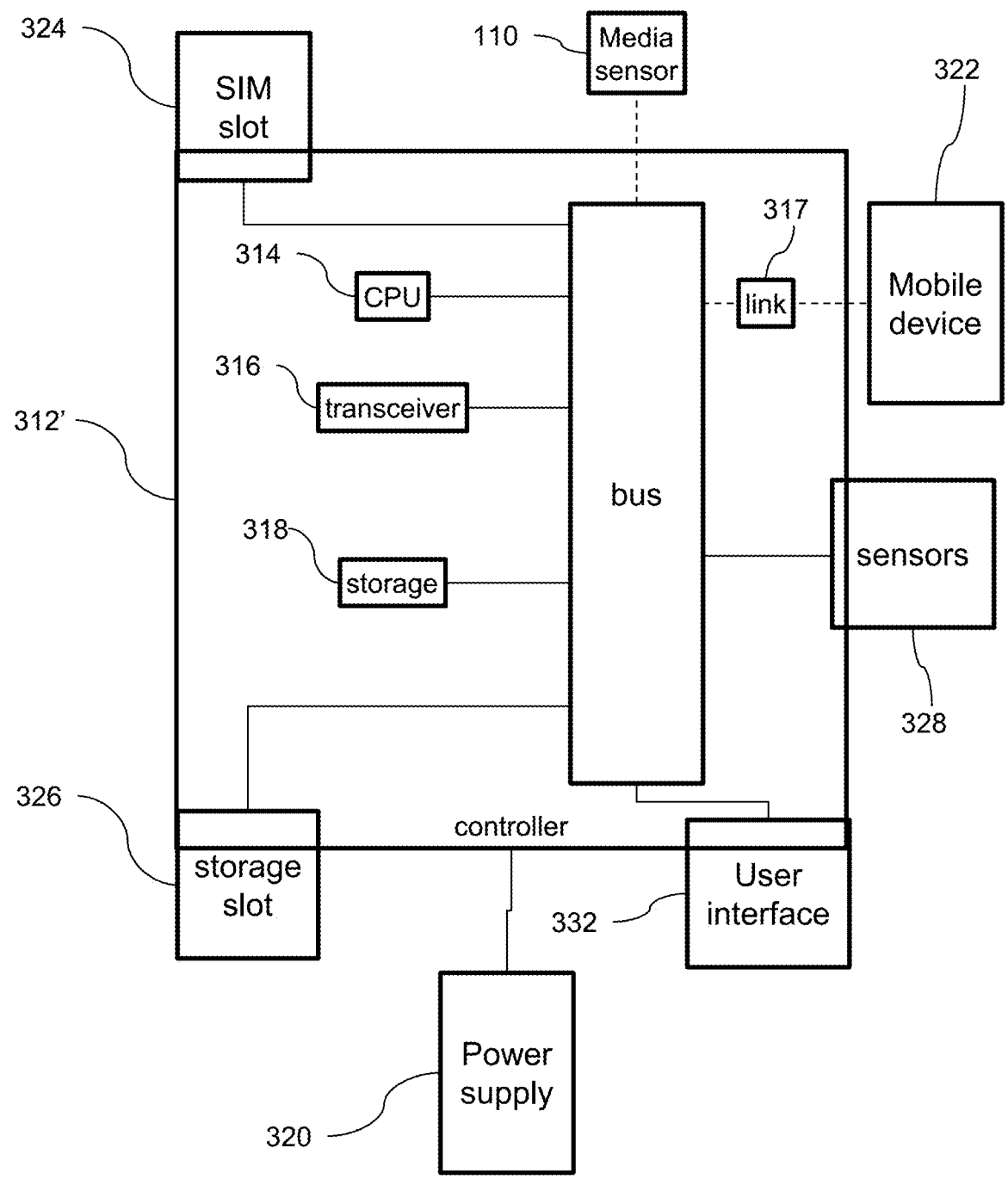
FIG. 3B is a block diagram of a controller in accordance with further embodiments of the current invention.

In some embodiments, the apparatus is operationally connected to a controller. For example, the controller 112 and/or a portion thereof may be integrated into the support structure 102 and/or a may be connected via wires to the support structure and/or may be connected wirelessly to the sensor 110 and/or to the mobile device. Optionally, the controller 112 includes components for processing, storing and/or communicating data between the sensor 110 of the apparatus and/or the portable device and/or a remote device. Alternatively or additionally, the controller 112 may communicate data from the mobile device to a remote device and/or to data storage of the controller 112. Alternatively or additionally, the controller may transfer data between sensor 110 and a remote device. Alternatively or additionally, the controller 112 may be manage communication to a user (for example a vehicle operator and/or a passenger) for example via a user interface and/or sensor. For example, some optional components of a controller are illustrated in FIGS. 3A and 3B.

In some embodiments, data from the media sensor 110 is displayed to a user (e.g. an operator of the vehicle and/or a passenger) over a user interface of the mobile device and/or on a dedicated user interface of the apparatus. For example, a user interface may include a view screen and/or a loudspeaker and/or an earphone. Optionally, a loudspeaker and/or a microphone and/or a view screen and/or a touch screen and/or other controls may be integrated into the apparatus. Alternatively or additionally, components of the apparatus (e.g. the sensor 110 and/or the controller 112) and/or of the mobile device may be controlled from a user interface of the mobile device and/or on the apparatus. For example, the user interface may include a touch screen and/or a switch and/or a sensor and/or a microphone. For example, a sensor may sense gestures of a user.

Figure 1B:
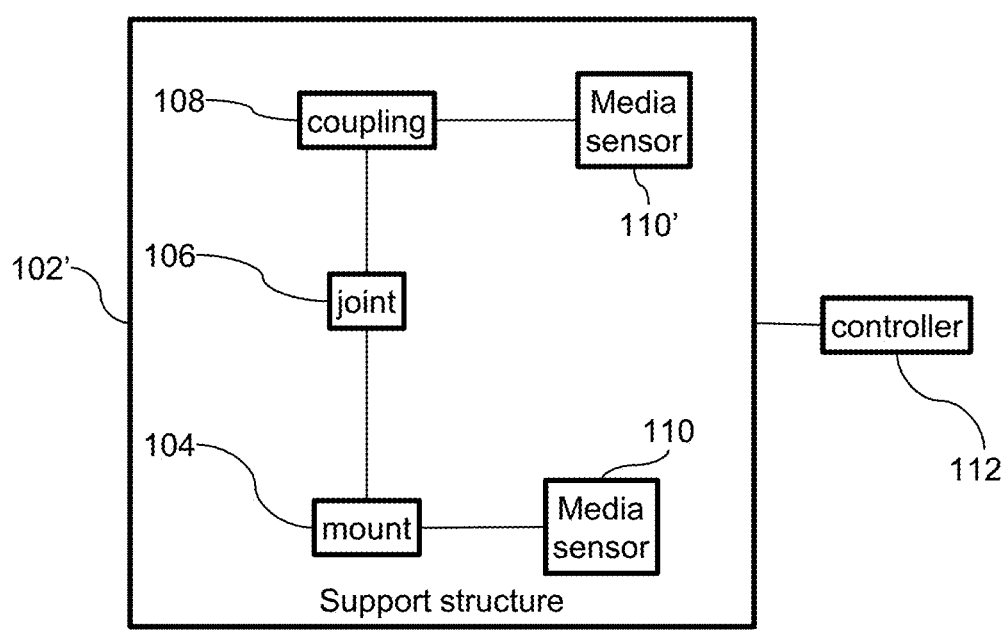
FIG. 1B is a block diagram of a mobile device holder in accordance with an embodiment of the current invention.

FIG. 1B is a block diagram of a mobile device holder in accordance with an embodiment of the current invention. In some embodiments, a media sensor 110' is mounted to and/or incorporated to coupling 108. For example, the sensor 110' may move with the mobile device. For example, mounting a camera on the front of the coupling 108 may be useful to keep the camera focused on the face of the vehicle operator and/or mounting a camera on the back of the coupling 108 may be useful for keeping track of what the vehicle operator sees. Optionally, there may be a joint (for example an adjustable joint similar to joint 106) between the coupling 108 and the sensor 110'. In some embodiments there may be a sensor 110 mounted to a mount 104 of the support structure 102'. Alternatively or additionally, in some embodiments, there may be a sensor 110' mounted to the coupling 108 without a further sensor mounted to the mount.

Figure 2:
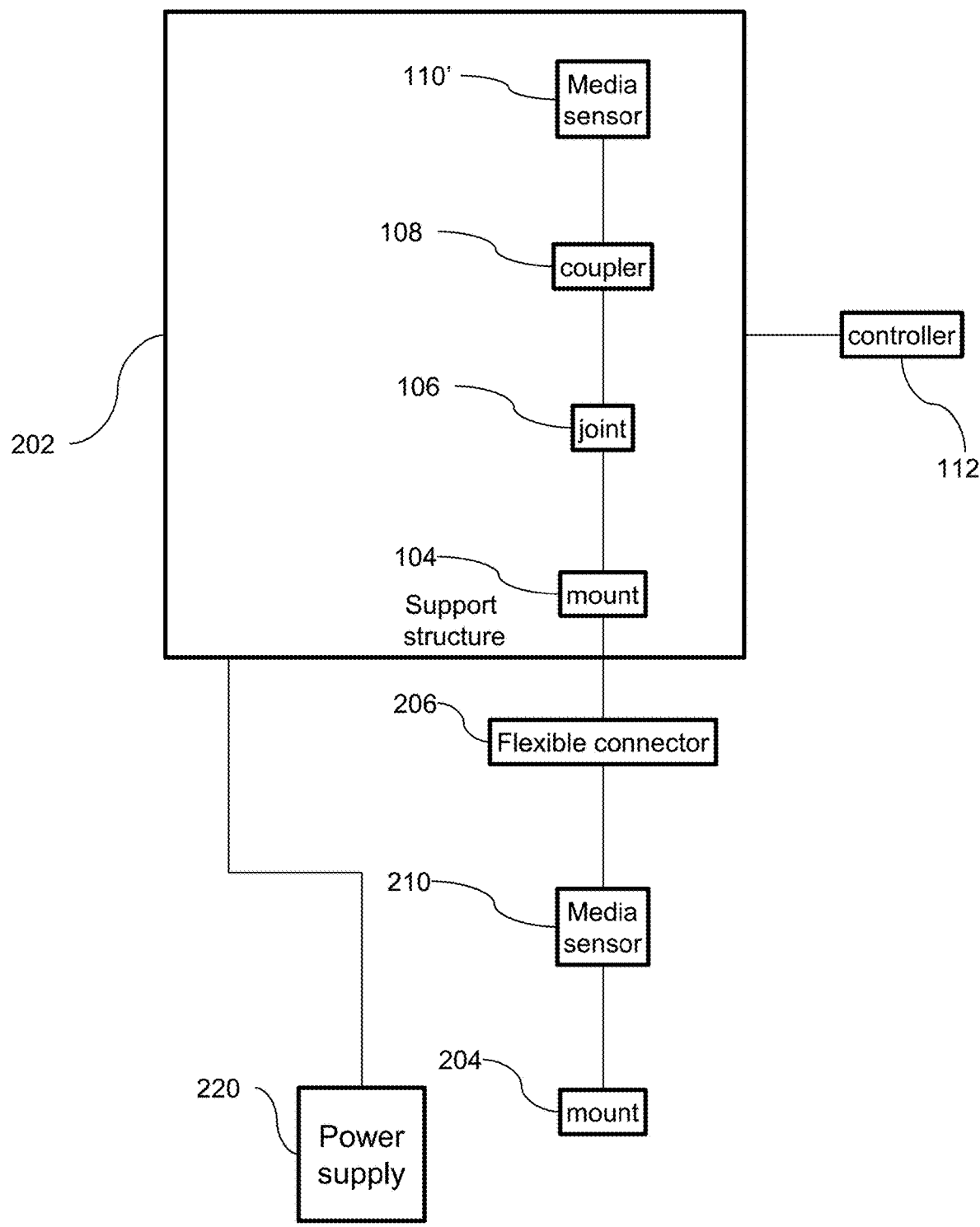
FIG. 2 is a block diagram of a mobile device holder in accordance with an embodiment of the current invention.

FIG. 2 is a block diagram of a mobile device holder in accordance with an embodiment of the current invention. In some embodiments, a media sensor 210 may be connected to a mount 104 of the support structure 202 by means of a flexible connector 206. For example, the positions of the media sensor 210 and/or of the coupler 108 may each be adjusted independently.

In some embodiments, there may be an independent sensor. For example, a coupler and/or one or more forward sensors 110' may be positioned on a front of a vehicle (for example, on a handlebar of a bicycle) and/or a additional sensor 210 may be in communication via a flexible connector (for example a cable and/or a wireless connection) to the controller 112 and/or power source 220 of the apparatus. For example, the controller 112 may send commands to the sensor 110' and/or receive data from the sensor 110'. For example, the additional sensor 210 may be connected by a mount 204 to the back of the bicycle and/or to a helmet of a bicycle operator. For example, the additional media sensor 210 may include a rear-view camera. Optionally, an image of what is going on behind the vehicle is displayed on a screen of the mobile device.

In some embodiments, various parts of a system may be packaged as a kit. For example, a kit may include a support structure 202 and/or an additional sensor 210 and/or a mount 204 for the additional sensor In any of the embodiments described herein, the apparatus may include a dedicated power supply 220 (for example a rechargeable battery). Alternatively or additionally, the apparatus my receive power from a power supply of the vehicle to which it is attached.

FIG. 3A is a block diagram of a controller 312 in accordance with an embodiment of the current invention. In some embodiments, a controller 312 includes a processor 314 and/or a wireless transceiver 316 and/or data storage 318 and/or a data bus. Alternatively or additionally, communication between the processor 314 and the mobile device 322 and/or between the processor 314 and the media sensor 110 may be via a wireless connection. For example, the wireless transceiver may supply connection between the processor 314 and/or the transceiver 316 and/or the storage 318 and/or a mobile device 322 of the user and/or a media sensor 110. Optionally the controller receives power from a dedicated power supply 320. Alternatively or additionally, the controller receives power from a power supply of the vehicle for example via a transformer and/or a switch mode transfer etc.

FIG. 3B is a block diagram of a controller 312' in accordance with further embodiments of the current invention. In some embodiments, a controller 312' may include connections to various optional devices. For example, there may be a slot for 324 for a SIM card to facilitate communication using the transceiver 316 over a wireless network. Alternatively or additionally, transceiver 316 may be configured for a SIM free connection and/or a Wi-Fi connection and/or a Satellite connection. In some embodiments, a controller 312' may include and/or be connected to a user interface 332. For example, the user interface 332 may include a microphone and/or a voice processing system configured to process voice commands. Alternatively or additionally, the user interface 332 may include an image sensor (e.g. a camera) directed to a vehicle operator and/or a gesture interpreting system. For example, the system may turn off and/or on a camera is response to a wave of the operator's hands and/or the system may switch a display to display a rear facing camera in response to a user pointing backwards. In some embodiments, the apparatus will include a connection for a removable memory, for example, a card slot 326 for a memory card. In some embodiments, the controller 312' will include a wireless link 317 (e.g. Bluetooth) facilitating communication between processor 314 and a user's mobile device 322. Alternatively or additionally, the wireless link may be used to connect to processor 314 to a vehicle on-board processor and/or to integrate functions of the apparatus and/or resources of the vehicle. In some embodiments, an apparatus may include further sensors, for example to sense sounds associated with a passenger and/or sensing a state of a car. For example, a sensor may sense whether the ignition is on (for example, the apparatus may be connected to a cigarette lighter and/or a USB port of the car and/or sense if the port is powered up). For example, putting together sensor data about the state of a car, its occupants and/or movements, the system may serve as a warning system for a child locked in a car and/or a burglar alarm.

Figure 4:
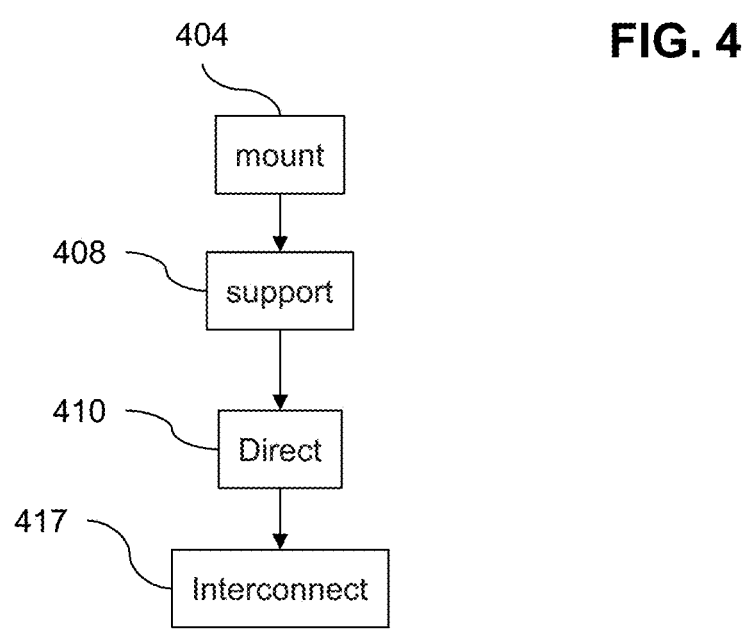
FIG. 4 is a flow chart of installing a mobile device holder in accordance with an embodiment of the current invention.

FIG. 4 is a flow chart of installing a mobile device holder in accordance with an embodiment of the current invention. In some embodiments, a support structure will be mounted 404 onto a vehicle. For example, the structure may be mounted 404 to a horizontal bar (e.g. a handle bar) and/or a vertical bar (e.g. head tube and/or steering column) of a personal mobility device (e.g. a bicycle, a scooter etc.) and/or a rearview mirror. Optionally the support structure may support a mobile device of a user. Additionally or alternatively, the support structure may include an integrated media sensor and/or controller. Optionally, there may be a secondary mount, for example, including a second media sensor. For example, the secondary mount may be mounted to a rear end of the vehicle. Optionally the secondary mount and/or the second media sensor operationally connected for data communication with the first mount and/or the controller.

In some embodiments, a sensor and/or a screen is directed 410. For example, an integral sensor may be connected to the mount and/or directed forward and/or backwards (for example, the sensor may be connected to the mount with a flexible joint and/or an adjustable joint) with respect to the vehicle and/or towards a passenger compartment of the vehicle. Alternatively or additionally, the mobile device may be directed 410 in a way that is convenient for the operator of the vehicle. In some embodiment, a camera (e.g. built into the apparatus and/or built into the mobile device may be directed 410 at the face of an vehicle operator (e.g. a camera may be connected to a front side of a coupler for a mobile device which is directed at the face of the vehicle operator).

In some embodiments, various components of the system may be interconnected 417. For example, a controller build into a support structure may be operationally interconnected 417 to a mobile device that is supported 408 on the support structure (for example the supporting 408 may be by means of a reversible connector as described in any embodiment herein). For example, a media sensor build into a support structure may be interconnected 417 to the controller and/or the mobile device. For example, a secondary sensor that is mounted elsewhere on the vehicle may be interconnected to the controller and/or the mobile device. For example, interconnection 417 may include arranging for data transfer between devices. For example, interconnection 417 may include arranging for power transfer between devices. Optionally, a data transfer interconnection 417 and/or power interconnection 417 may be wired and/or wireless. In some embodiments, interconnection 417 may include interconnecting to a remote device. For example, a controller integrated to a support structure may be interconnected 417 to a remote device via a wireless transceiver and/or a cellular network.

Figure 5:
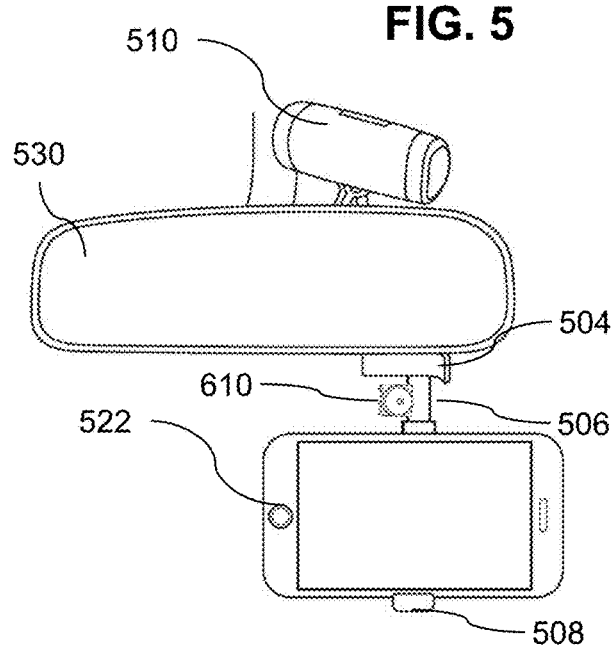
FIG. 5 is a perspective view of a mobile device holder connected to a rear-view mirror in accordance with an embodiment of the current invention.
Figure 6:
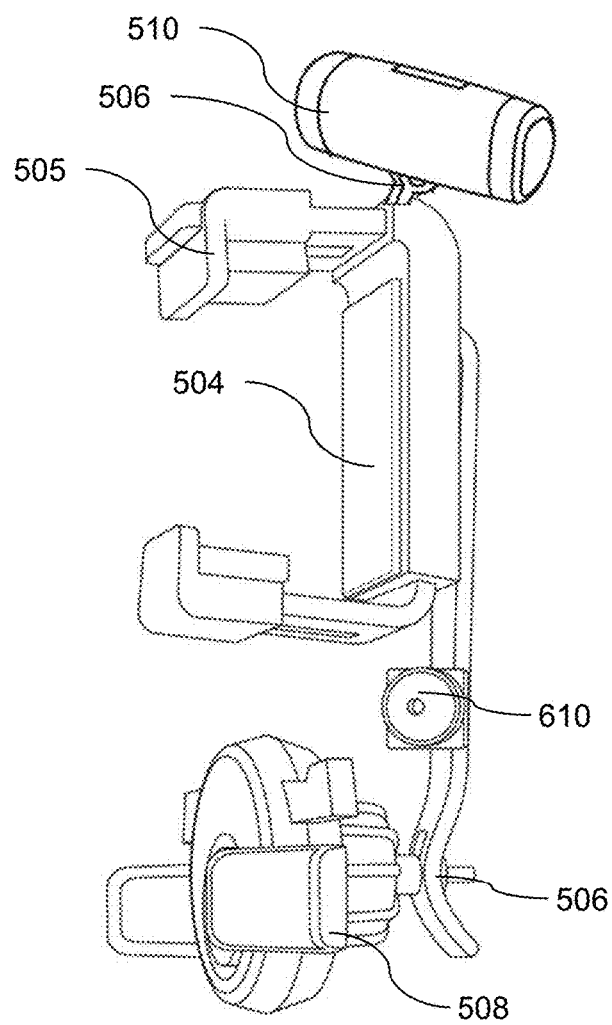
FIG. 6 is a perspective view of a mobile device holder configured for connection to a rear-view mirror in accordance with an embodiment of the current invention.

FIG. 5 is a perspective view of a mobile device holder connected to a rear-view mirror 530 in accordance with an embodiment of the current invention and FIG. 6 is a perspective view of a mobile device holder configured for connection to a rear-view mirror 530 in accordance with an embodiment of the current invention. In some embodiments, a support structure includes a mount 504 configured to attach to a rearview mirror 530 of a vehicle. For example, mount 504 includes an adjustable clamp and/or flexible clamp 505 that firmly grasps a mirror 530 such that mount 504 remains stationary with respect to the mirror 530. Alternatively or additionally, a mount may loosely hang from the mirror 530. Optionally, apparatus includes an integral forward-facing media sensor 510 (for example a webcam). Optionally, sensor 510 is connected to mount 504 with a flexible joint 506. For example, joint 506 may facilitate directing sensor 510 in a desired direction (e.g. out the windshield of the vehicle). In some embodiments, a second sensor 610 may be integrated into the support structure. For example, the second sensor may be directed towards the passenger compartment of the vehicle. Optionally the first and second sensors 510, 610 are connected to mount 504 and/or remain stationary with regard to mount 504. For example, this may facilitate the field of view of sensors 510, 610 remaining fixed with respect to the vehicle.

In some embodiments, the support structure may include a coupling 508 configured to hold a mobile device. For example, coupling 508 clamps to a mobile device. Optionally, a sensor may be integrated into coupling 508. For example, a sensor integrated into coupling 508 may move with the coupling and/or be kept directed at a face of a vehicle operator and/or the user of the mobile device. For example, coupling 508 may be attached to mount 504 across an adjustable joint 506 allowing. A sensor attached to coupling 508 may also attached to mount 504 across the adjustable joint 506.

Optionally, the support structure may include an integrated controller (for example as illustrated in FIGS. 3A and 3B. The mobile device and/or sensors 510, 610 are optionally interconnected to a processor of the controller (e.g. with a wired connection and/or a wireless connection, for example for control, power and/or data transfer).

Figure 7:
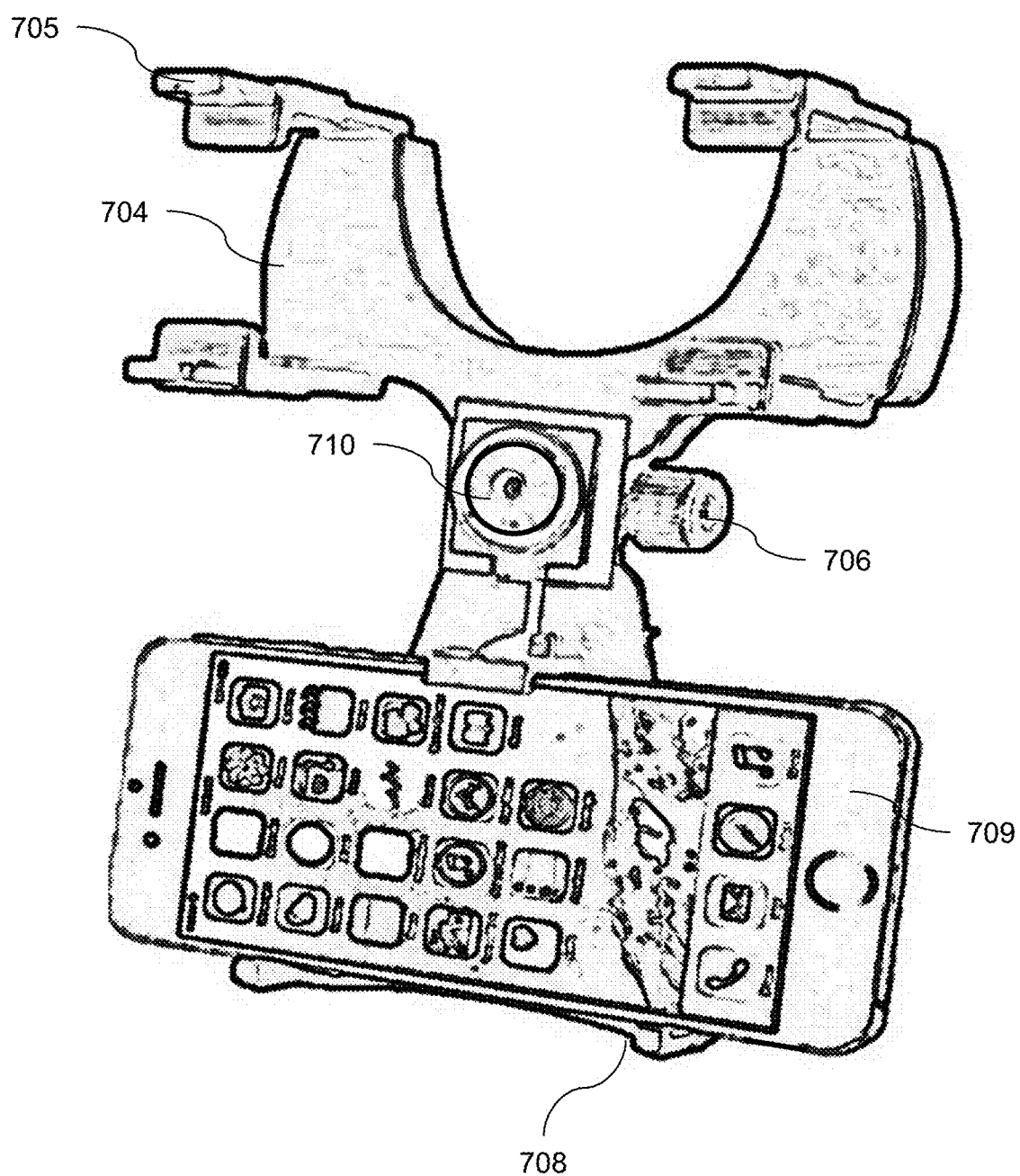
FIG. 7 is a perspective view of a mobile device and a mobile device holder configured for connection to a rear-view mirror in accordance with an embodiment of the current invention.

FIG. 7 is a perspective view of a mobile device and a mobile device holder configured for connection to a rear-view mirror in accordance with an embodiment of the current invention. In some embodiment, a support structure includes a mount 704 for connecting to a rearview mirror, for example by clamps 705. Additionally or alternatively, a coupling 708 configured to hold a mobile device 709 (for example a cell phone) may be supported on the mount 704. Optionally the coupling is adjustable connected to the mount via an adjustable joint 706. Optionally a media sensor 710 (for example including a webcam and/or a microphone) is integrated into the support structure. In some embodiments the mobile device 709 is operationally connected to the sensor 710. For example, the connection may be wireless and/or wired. For example, the connection may be direct and/or via a controller of the support structure.

Figure 8:
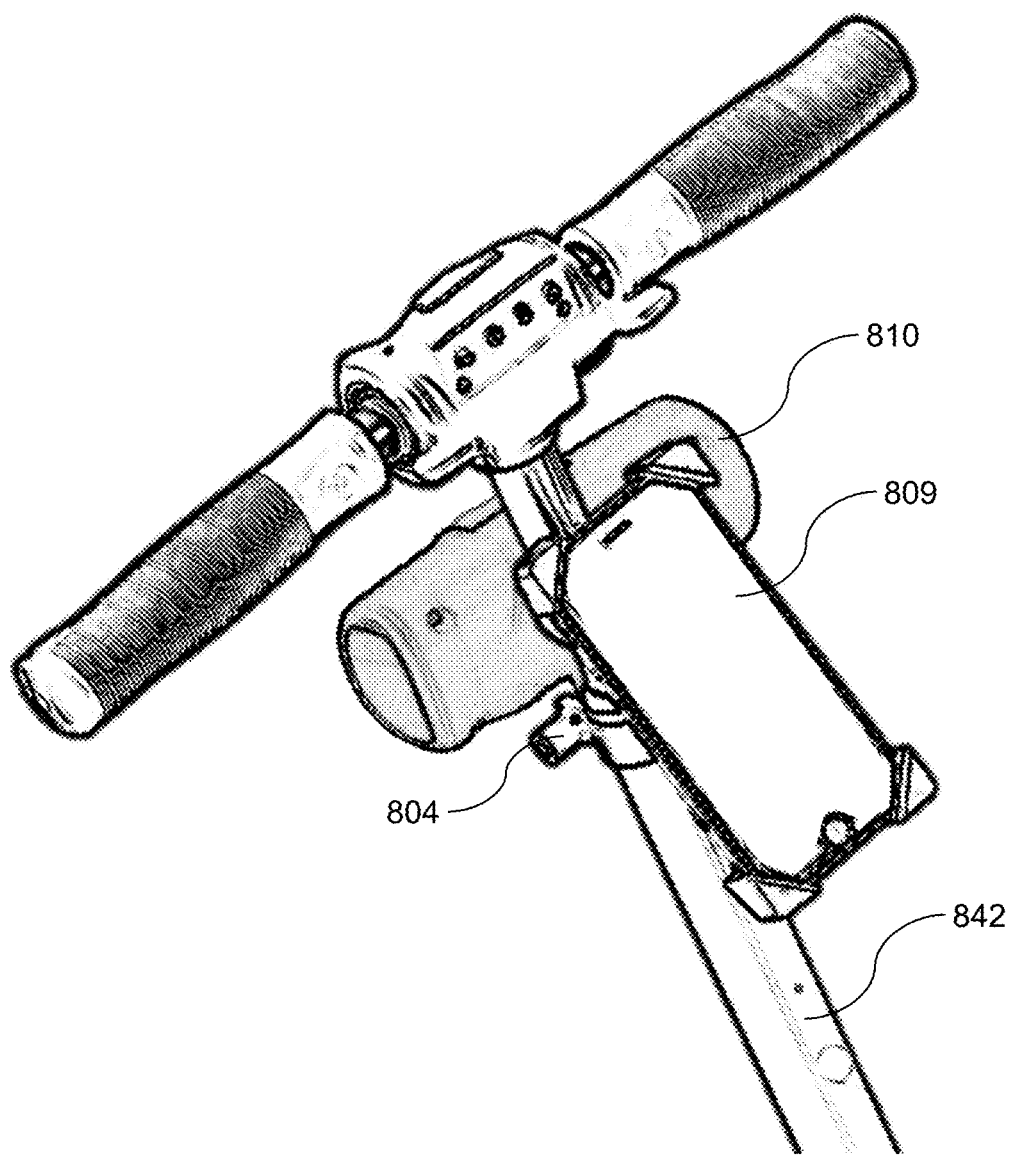
FIG. 8 is a perspective view of a mobile device and a mobile device holder attached to a scooter in accordance with an embodiment of the current invention.

FIG. 8 is a perspective view of a mobile device and a mobile device holder attached to a vertical bar of a scooter in accordance with an embodiment of the current invention. In some embodiments, a mount may be attached to a steering column 842 of a personal mobility device (for example a scooter). Optionally, the mount 804 supports a mobile device 809 (for example a cell phone). Additionally or alternatively, mount 804 supports a media sensor 810. Optionally a direction of media sensor 810 and/or mobile device 809 may be adjusted together and/or independently.

Figure 9:
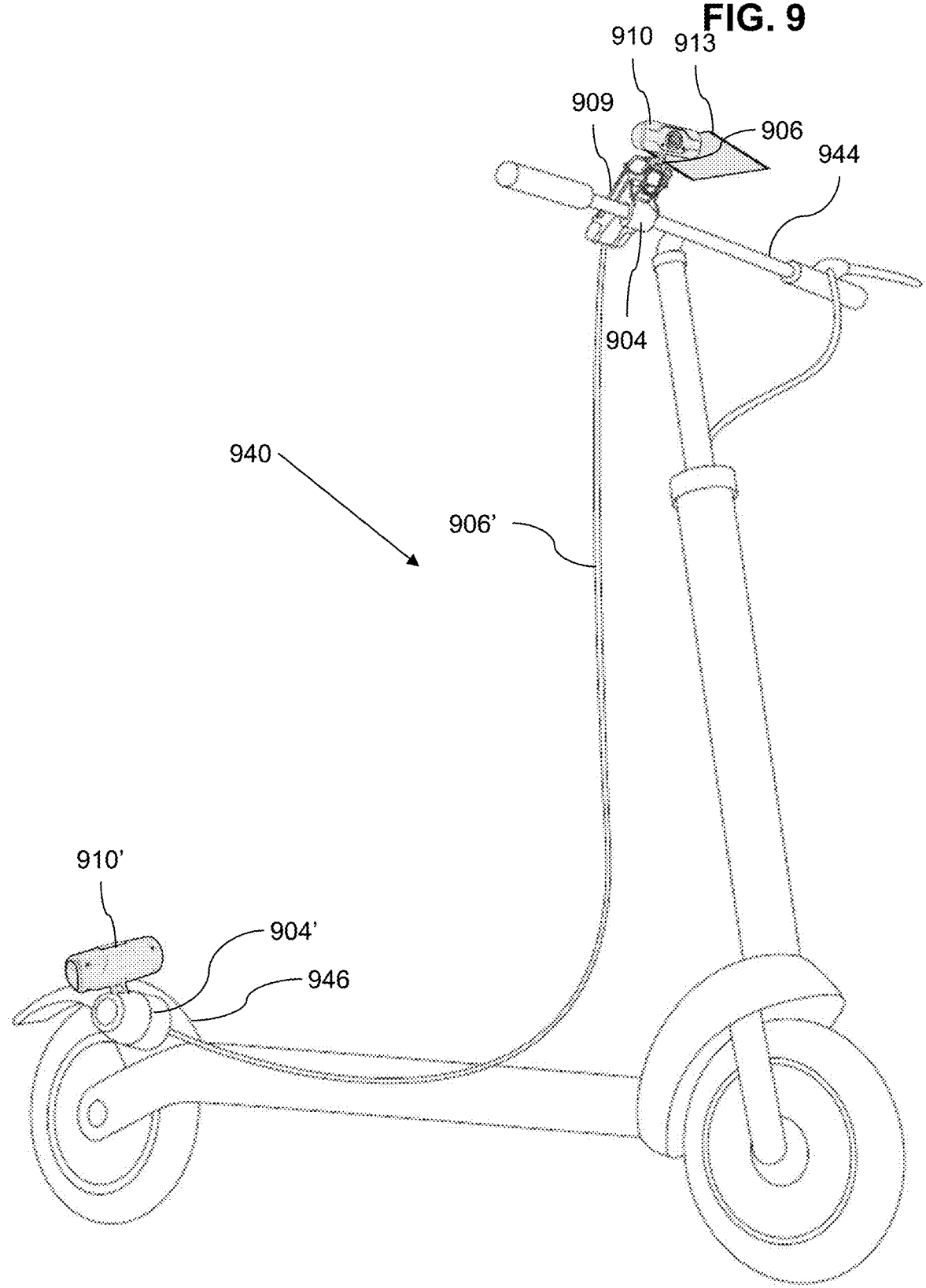
FIG. 9 is a perspective view of a mobile device holder attached to a horizontal bar of a scooter in accordance with an embodiment of the current invention.

FIG. 9 is a perspective view of a mobile device and a mobile device holder attached to a horizontal bar of a scooter 940 in accordance with an embodiment of the current invention. In some embodiments, a mount 904 may be attached to a handlebar 944 of a personal mobility device (for example scooter 940). Optionally, the mount 904 supports a mobile device 909 (for example a cell phone). Additionally or alternatively, mount 904 supports a media sensor 910. Optionally a direction of media sensor 910 and/or mobile device 909 may be adjusted together and/or independently. For example, media sensor 910 may be connected to mount 904 via a flexible joint 906. For example, sensor 910 is directed in a direction of travel by means of joint 906.

In some embodiments, an apparatus may include a secondary media sensor 910' and/or a secondary mount 904'. For example, sensor 910' is mounted to a rear fender 946 of the scooter 940 and/or is directed rearward. Optionally a flexible connector 906' (e.g. a cable) connects sensor 910' to a controller of mount 904 and/or to device 909. For example, connector 906' may be used for data transfer and/or power supply. Alternatively or additionally, a wireless connector may be supplied. For example, sensor 910' may include a webcam and/or an image from the webcam may be displayed on a display of device 909. For example, this may facilitate a vehicle operator tracking what is going on behind him. Alternatively or additionally, a secondary mount 904' may also hold other components (for example a light).

In some embodiments, an apparatus may include a charging system. For example, the charging system may include a solar panel 913. Optionally, solar panel can be stowed, for example, it may fold up and/or may be disconnected and/or separated from the mount 904. For example, a user may deploy the solar panel 913 while the vehicle (e.g. scooter 940) is parked and/or charge a battery of the apparatus. For example, when traveling, the solar panel 913 may be stowed to protect it from damage (e.g. due to wind, vibration and/or collision with objects). In some embodiments, the charging system may include a USB plug and/or port. For example, for an electric vehicle (e.g. an electric scooter and/or bicycle) the apparatus may plug into a USB port of the vehicle and/or charge from the main battery of the vehicle.

Figure 10:
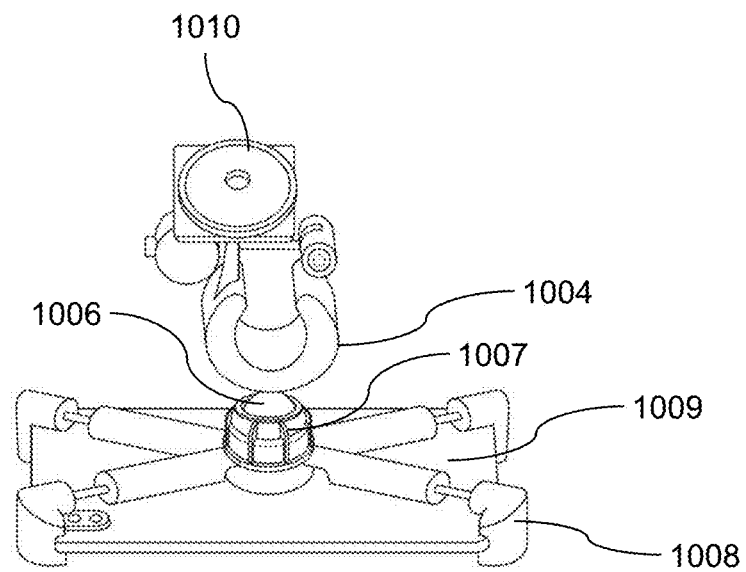
FIG. 10 is a perspective view of a mobile device and a mobile device holder in accordance with an embodiment of the current invention.

FIG. 10 is a perspective view of a mobile device and a mobile device holder in accordance with an embodiment of the current invention. In some embodiments, a coupler 1008 configured to hold a mobile device 1009 is connected to a mount 1004. For example, mount 1004 is configured to attach to a bar of a personal mobility device, for example a handlebar and/or steering column of a bicycle. Optionally, the apparatus includes an integrated sensor 1010. For example, sensor 1010 includes a webcam. Images from the webcam are optionally processed and/or stored in a controller integrated into the support structure of the coupler 1008 and/or mount 1004. Optionally the controller and/or the mobile device 1009 are operationally connected for data transfer, for example, by a wired and/or wireless connection.

In some embodiments, a flexible joint 1006 connects between mount 1004 and coupler 1008. For example, joint 1006 includes a ball joint and/or a locking mechanism (e.g. a locking ring 1007). Optionally, joint 1006 is positioned between coupler 1008 and sensor 1010 such that a position of device 1009 with respect to mount 1004 can be adjusted while sensor remains stable with respect to mount 1004. For example, sensor 1010 may have a field of view FOV directed forward (in the direction of travel and/or at the roadway in front of the vehicle). A rider may adjust a position of device 1009 according to a personal preference and/or an angle of the sun etc. while the FOV of sensor 1010 remains fixed.

Figure 11:
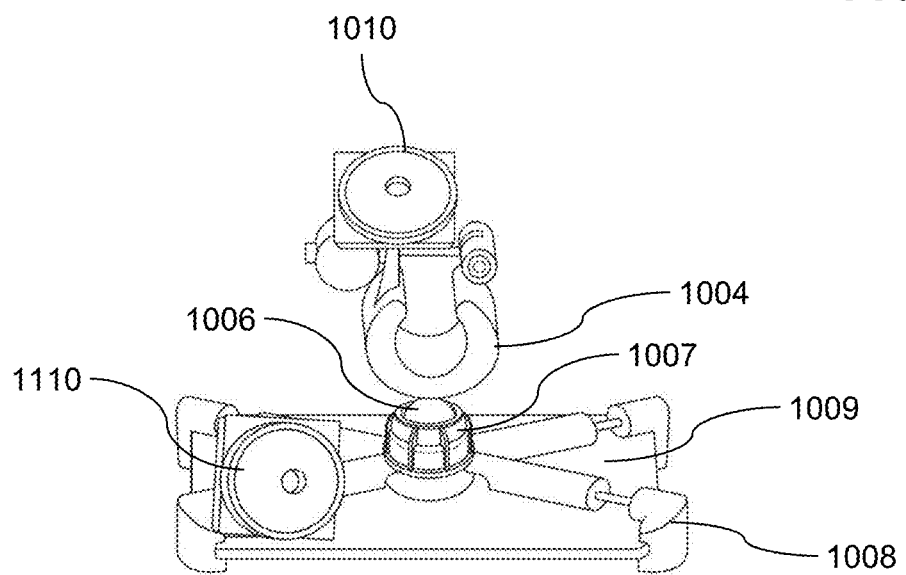
FIG. 11 is a perspective view of another mobile device and a mobile device holder in accordance with an embodiment of the current invention.

FIG. 11 is a perspective view of another mobile device and a mobile device holder in accordance with an embodiment of the current invention. The apparatus of FIG. 11 is similar to that of FIG. 10 (similar components having the same labels). The apparatus of FIG. 11 includes a second sensor 1110. For example, sensor 1110 is attached to coupler 1008 and/or on the same side of joint 1006 as the coupler 1008. Thus, sensor 1110 moves with device 1009. For example, sensor 1104 has a FOV that corresponds the view of the operator of the vehicle as he views the screen of device 1009 and/or may be directed toward the operator of the vehicle (e.g. when the operator changes positions, he will also change the position of device 1009 and/or keep sensor 1010 directed as intended.

Figure 12:
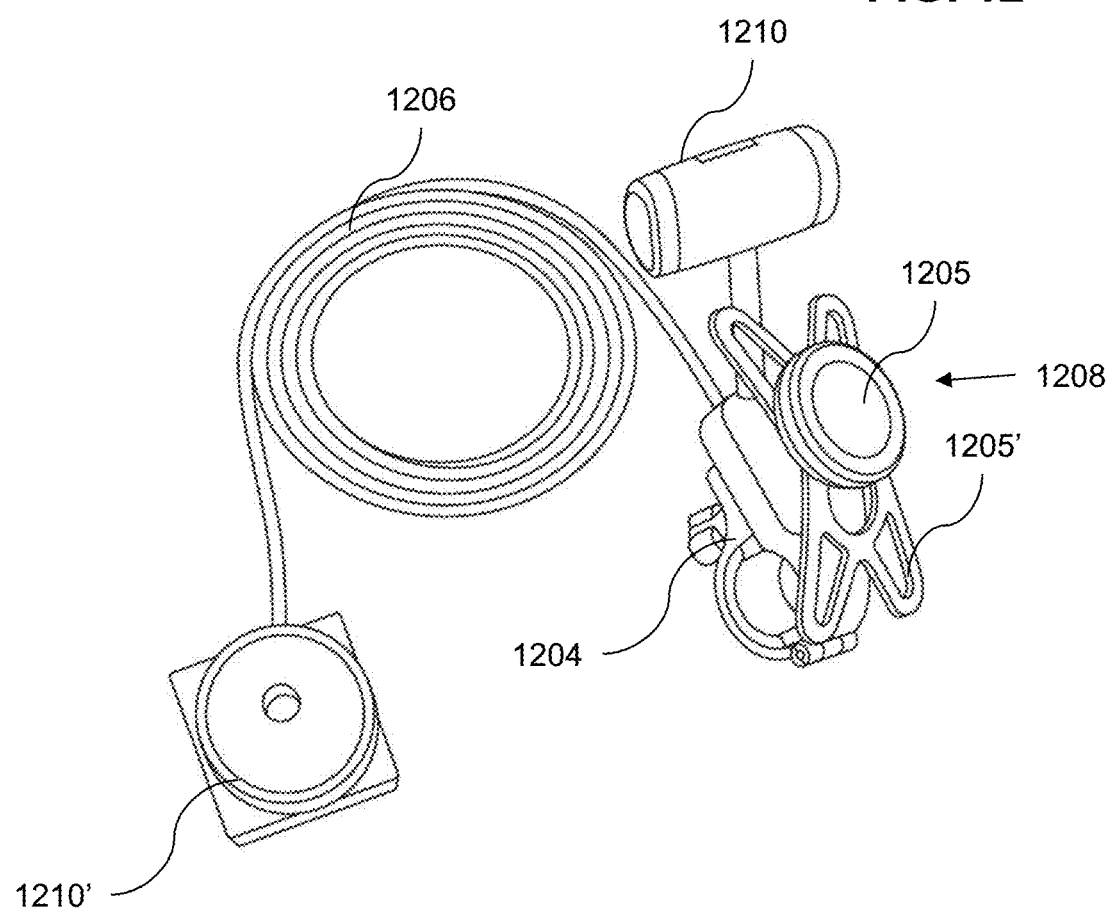
FIG. 12 is a perspective view of a mobile device holder system in accordance with an embodiment of the current invention.

FIG. 12 is a perspective view of a mobile device holder system in accordance with an embodiment of the current invention. In some embodiment the holder includes a coupler 1208 for reversibly holding a mobile device. For example, coupler 1208 may include a magnetic and/or low slip base 1205 and/or elastic straps 1205' that grip and/or hold the mobile device. Optionally, the coupler 1208 is connected to a mount 1204 configured for connection to a bar of a vehicle (e.g. a handlebar of a bicycle). Optionally the system includes a senor 1210 also supported on mount 1204. Additionally or alternatively, the system includes a secondary sensor 1210' configured to connect elsewhere on the vehicle. For example, the secondary sensor may include a secondary mount for attaching to the rear of a seat of a bicycle and/or to a seat post and/or to a luggage rack and/or to a rear axle etc. A flexible cable 1206 may supply data communication and/or power communication between the secondary sensor 1210' and a controller integrated into the system and/or the mobile device. In some embodiments, some or all of the components of any of the embodiment of the system may be packaged and/or sold as kit. Optionally, the secondary mount may also support other components such as a rear light etc.

It is expected that during the life of a patent maturing from this application many relevant transportation devices, sensors, processors and/or mobile devices will be developed and the scope of the terms is intended to include all such new technologies a priori.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. When multiple ranges are listed for a single variable, a combination of the ranges is also included (for example the ranges from 1 to 2 and/or from 2 to 4 also includes the combined range from 1 to 4).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An apparatus for connecting a mobile electronic device to a vehicle comprising:
    a support structure including:
        a mount configured for connecting the apparatus to a vertical tube and configured for connecting the apparatus a horizontal tube of the vehicle,
        a coupling mechanism adapted for removably coupling to the mobile device,
        a first flexible joint connecting the coupling mechanism to the mount, and
        a second flexible joint;
    a processor built into said support structure;
    a databus configured for transferring data between said processor and the mobile device; and
    a media sensor connected to said mount by said second flexible joint and electronically connected to said processor and wherein said second flexible joint is rotatable such that a position of a field of view of the media sensor can be adjusted to a direction of travel of the vehicle when the mount is connected to said vertical tube and when the mount is connected to said vertical tube and wherein said first flexible joint is positioned such that a position of said mobile device can be adjusted while said media sensor remains stationary.

2. The apparatus of claim 1, wherein said databus is wireless.

3. The apparatus of claim 1, further comprising:
    a rechargeable battery supplying energy to said processor and said media sensor.

4. The apparatus of claim 3, further comprising:
    a conductor configured for conducting said energy from said rechargeable battery to said mobile device.

5. The apparatus of claim 3, further comprising:
    a charger configured for conducting energy from a battery of said vehicle to said rechargeable battery.

6. The apparatus of claim 3, further comprising a charging system including a solar panel configured for reversible coupling to the mount.

7. The apparatus of claim 1, further comprising:
    a charger configured for conducting energy from a battery of said vehicle to said processor and said media sensor.

8. The apparatus of claim 1, further comprising:
    a wireless network transceiver operationally coupled to said processor, said wireless network transceiver configured for data communication with a cellular network.

9. The apparatus of claim 1, further comprising:
    a storage medium, operationally coupled to said media sensor, said processor configured to record and store visual, audio or audiovisual input, sensed by said media sensor, on said storage medium.

10. The apparatus of claim 1, wherein said processor is configured to activate said media sensor upon sensing motion within a field of view or noise above a predefined volume threshold.

11. The media sensor of claim 1, wherein said second flexible joint is configured to automatically keep said media sensor directed in a direction of travel of said vehicle when said vehicle during at least on maneuver selected from turning said horizontal bar and tipping said vehicle.

12. The apparatus of claim 1, wherein said media sensor includes at least one sensor selected from a video camera, a microphone and a combination audiovisual sensor.

13. The apparatus of claim 1, wherein said media sensor includes a plurality of sensors.

14. The apparatus of claim 1, further comprising a hands-free communication system.

15. The apparatus of claim 1, further comprising a remote camera in data communication with said processor.

16. The apparatus of claim 15, further comprising a cable connecting said remote camera to said processor.

17. The apparatus of claim 15, further comprising a second mount for attaching to said vehicle and wherein said remote camera is integrated to said second mount.

18. The apparatus of claim 17, wherein said second mount includes a rear light.

19. The apparatus of claim 17, wherein said second mount is attached to at least one of a rear fender of the vehicle and a rear of a seat of the vehicle.

* * * * *